United States Patent
Kimura

(10) Patent No.: US 11,238,597 B2
(45) Date of Patent: Feb. 1, 2022

(54) SUSPICIOUS OR ABNORMAL SUBJECT DETECTING DEVICE

(71) Applicant: ASILLA, INC., Tokyo (JP)

(72) Inventor: Daisuke Kimura, Tokyo (JP)

(73) Assignee: ASILLA, INC., Tokyo (JP)

( * ) Notice: Subject to any disclaimer, the term of this patent is extended or adjusted under 35 U.S.C. 154(b) by 0 days.

(21) Appl. No.: 17/295,485

(22) PCT Filed: Nov. 21, 2019

(86) PCT No.: PCT/JP2019/045563
§ 371 (c)(1),
(2) Date: May 20, 2021

(87) PCT Pub. No.: WO2020/110879
PCT Pub. Date: Jun. 4, 2020

(65) Prior Publication Data
US 2022/0005204 A1    Jan. 6, 2022

(30) Foreign Application Priority Data

Nov. 27, 2018 (JP) .............................. JP2018-221374
Jun. 21, 2019 (JP) .............................. JP2019-115598

(51) Int. Cl.
*G06K 9/00* (2006.01)
*G06T 7/20* (2017.01)
*G06T 7/70* (2017.01)

(52) U.S. Cl.
CPC ............ *G06T 7/20* (2013.01); *G06K 9/00342* (2013.01); *G06T 7/70* (2017.01); *G06T 2207/10016* (2013.01)

(58) Field of Classification Search
CPC ................................................. G06K 9/00771
See application file for complete search history.

(56) References Cited

U.S. PATENT DOCUMENTS

| 2005/0157908 A1* | 7/2005 | Matsugu ............ G06K 9/00885 |
| | | 382/107 |
| 2007/0140528 A1* | 6/2007 | Anai ........................ G06T 7/33 |
| | | 382/106 |

(Continued)

FOREIGN PATENT DOCUMENTS

| CN | 104038738 | 9/2014 |
| JP | 2007 328435 | 12/2007 |

(Continued)

OTHER PUBLICATIONS

Nakada Satoshi Nakata, an information control system, the Hitachi criticism the 98thvolume by No. 3, Hitachi Hyoronsha, and the 98th-volume image analysis, [ deviationoperation of people ] The craftsmanship spot—and Hitachi which evolve in detection-collaborative innovation, Sep. 15, 2017, URL,https://www.hitachi.co.jp/rd/portal/contents/story/deviation/index.html.

(Continued)

*Primary Examiner* — Hadi Akhavannik
(74) *Attorney, Agent, or Firm* — Jeffrey S. Melcher; Melcher Patent Law PLLC

(57) ABSTRACT

[Problem]
To provide a suspicious or abnormal subject detecting device for detecting a suspicious or abnormal subject appeared in time-series images.
[Solution]
An accumulating device 2 includes a first detecting unit 23 for detecting movement of a plurality of articulations includes in an action subject Z appeared in a plurality of first time-series images Y1 obtained by photographing a predetermined point; and a determining unit 24 for determining one or more of normal actions at the predetermined point based on a large number of movement of the plurality of articulations detected by the first detecting unit 23. The detecting device 3 includes a second detecting unit 33 for (Continued)

detecting movement of a plurality of articulations includes in an action subject Z appeared in a plurality of second time-series images Y2 obtained by photographing the predetermined point; and an extracting unit 34 for extracting, when the movement of a plurality of articulations detected by the second detecting unit 33 is different from the normal action determined by the determining unit 24, the action subject Z which has performed the action different from the normal action from among the plurality of second time-series images Y2.

6 Claims, 2 Drawing Sheets

(56) References Cited

U.S. PATENT DOCUMENTS

| | | | | |
|---|---|---|---|---|
| 2010/0118163 A1* | 5/2010 | Matsugu | ............ | G03B 17/16 |
| | | | | 348/231.99 |
| 2011/0255748 A1* | 10/2011 | Komoto | ............ | G06T 7/246 |
| | | | | 382/103 |
| 2015/0092978 A1 | 4/2015 | Wu | | |
| 2016/0259881 A1* | 9/2016 | Kiefer | ............ | G16B 20/20 |
| 2016/0321257 A1 | 11/2016 | Chen | | |

FOREIGN PATENT DOCUMENTS

| | | |
|---|---|---|
| JP | 2010-72782 | 4/2010 |
| JP | 2012 104022 | 5/2012 |
| JP | 2014 165607 | 9/2014 |
| JP | 2018 160219 | 10/2018 |

OTHER PUBLICATIONS

"Mobility Deep Dive" announces on inside Apr. 19, 31. "IoT DeepDive" announces onHeisei 31Apr. 23, 2019.

Decision to Grant a Patent, JP 2019-15598, dated Nov. 14, 2019, pp. 1-4 of Translation.

International Search Report issued in PCT/JP2019/045563, dated Dec. 24, 2019, p. 1. Includes translation.

Written Opinion issued in PCT/JP2019/045563, dated Dec. 24, 2019, pp. 1-3.

* cited by examiner

SUSPICIOUS OR ABNORMAL SUBJECT DETECTING DEVICE

TECHNICAL FIELD OF THE INVENTION

The present invention relates to a suspicious or abnormal subject detecting device for detecting a suspicious or abnormal subject appeared in time-series images.

BACKGROUND OF THE INVENTION

Conventionally, a technique for analyzing the movement or action of a person appeared in image data and detecting a suspicious person based on whether or not the person has performed a pre-registered pattern of movement or action has been known (see, for example, Patent Document 1).

PRIOR ART

Patent Document 1: Japanese Patent Application publication No. 2017-068394

SUMMARY OF INVENTION

Problem to be Solved by the Invention

However, in the above-described technique, since it is necessary to register the movement or action pattern in advance, it takes labor to perform the registration work, and in addition, there is a possibility that the registered movement or action pattern is not appropriate.

In view of the foregoing, it is an object of the invention to provide a suspicious or abnormal subject detecting device capable of easily and high-accurately detecting a suspicious or abnormal subject.

Means for Solving the Problem

The present invention provides a suspicious or abnormal subject detecting device includes: an accumulating device; and a detecting device. The accumulating device includes: a first obtaining unit configured to obtain a plurality of first time-series images obtained by photographing a predetermined point; a first detecting unit configured to detect movement of a plurality of articulations included in an action subject appeared in the plurality of first time-series images; and a determining unit configured to determine one or more of normal actions at the predetermined point based on a large number of the movement of a plurality of articulations detected by the first detecting unit. The detecting device includes: a second obtaining unit configured to obtain a plurality of second time-series images obtained by photographing the predetermined point; a second detecting unit configured to detect movement of a plurality of articulations included in an action subject appeared in the plurality of second time-series images; and an extracting unit configured to extract, when the movement of a plurality of articulations detected by the second detecting unit is different from the normal action determined by the determining unit, an action subject which has performed an action different from the normal action from among the plurality of second time-series images.

With this configuration, it becomes possible to easily and high-accurately detect a suspicious or abnormal subject simply by detecting an "unusual action" without registering a suspicious action in advance or identifying the type of detected action.

It is preferable that the first detecting unit detects a plurality of articulations corresponding to articulation identification criteria for identifying a plurality of articulations of an action subject, specifies an action subject appeared in the plurality of first time-series images by specifying a plurality of articulations included in one action subject referring action subject specific criteria indicating basic postures of many variations of an action subject, ranges of movement of each articulation, and distances between each articulation in one action subject, and detects movement of the plurality of articulations included in the specified action subject. The determining unit determines one or more of normal actions at the predetermined point based on the large number of the movement of the plurality of articulations detected by the first detecting unit. The second detecting unit detects a plurality of articulations corresponding to articulation identification criteria for identifying a plurality of articulations of an action subject, in the plurality of second time-series images, specifies an action subject appeared in the plurality of second time-series images by specifying a plurality of articulations included in one action subject referring action subject specific criteria indicating basic postures of many variations of an action subject, ranges of movement of each articulation, and distances between each articulation in one action subject, and detects movement of the plurality of articulations included in the specified action subject. The extracting unit extracts, when the movement of a plurality of articulations detected by the second detecting unit is different from the normal action determined by the determining unit, an action subject which has performed an action different from the normal action from among the plurality of second time-series images.

With this configuration, it becomes possible to more easily and high-accurately detect a suspicious or abnormal subject.

It is preferable that the suspicious or abnormal subject detecting device further includes a producing unit configured to produce individual identifying information for the extracted action subject based on at least one second time-series image.

With this configuration, it becomes possible to confirm whether or not the extracted action subject has actually executed a suspicious or abnormal action, and to concretely grasp the characteristics of the extracted action subject.

It is preferable that the suspicious or abnormal subject detecting device further includes a transmitting unit configured to automatically transmit the individual identification information produced by the producing unit to a registered information terminal.

With this configuration, since it is possible to immediately notify an emergency or a danger to the outside, it becomes possible to quickly deal with it, attributing to a crime prevention.

Another aspect of this invention provides a suspicious or abnormal subject detecting program installed on a computer. The program includes: a step for obtaining a plurality of first time-series images obtained by photographing a predetermined point; a step for detecting movement of a plurality of articulations included in an action subject appeared in the plurality of first time-series images; a step for determining one or more of normal actions at the predetermined point based on a large number of the detected movement of a plurality of articulations; a step for obtaining a plurality of second time-series images obtained by photographing the predetermined point; a step for detecting movement of a plurality of articulations included in an action subject appeared in the plurality of second time-series images; and a step for extracting, when the movement of a plurality of articulations detected with respect to the plurality of second time-series images is different from the determined normal action, an action subject which has performed an action different from the normal action from among the plurality of second time-series images.

It is preferable that the step for detecting in the plurality of first time-series images includes: a step for detecting a plurality of articulations corresponding to articulation identification criteria for identifying a plurality of articulations of an action subject; a step for specifying an action subject appeared in the plurality of first time-series images by specifying a plurality of articulations included in one action subject referring action subject specific criteria indicating basic postures of many variations of an action subject, ranges of movement of each articulation, and distances between each articulation in one action subject; and a step for detecting movement of the plurality of articulations included in the specified action subject. The step for determining determines one or more of normal actions at the predetermined point based on the detected large number of the movement of the plurality of articulations. The step for detecting in the plurality of second time-series images includes: a step for detecting a plurality of articulations corresponding to articulation identification criteria for identifying a plurality of articulations of an action subject, in the plurality of second time-series images; a step for specifying an action subject appeared in the plurality of second time-series images by specifying a plurality of articulations included in one action subject referring action subject specific criteria indicating basic postures of many variations of an action subject, ranges of movement of each articulation, and distances between each articulation in one action subject; and a step for detecting movement of the plurality of articulations included in the specified action subject. The step for extracting extracts, when the movement of a plurality of articulations detected with respect to the second time-series images is different from the determined normal action, an action subject which has performed an action different from the normal action from among the plurality of second time-series images.

It is preferable that the suspicious or abnormal subject detecting program further includes a step for producing individual identifying information for the extracted action subject based on at least one second time-series image.

It is preferable that the suspicious or abnormal subject detecting program further includes a step for automatically transmitting the produced individual identification information to a registered information terminal.

Effects of the Invention

According to the suspicious or abnormal subject detecting device of the present invention, it is possible to easily detect the suspicious or abnormal subject with high accuracy.

PREFERRED EMBODIMENTS

A suspicious or abnormal subject detecting device 1 according to an embodiment of the present invention will be described below with reference to FIGS. 1 to 3.

Figure 1:
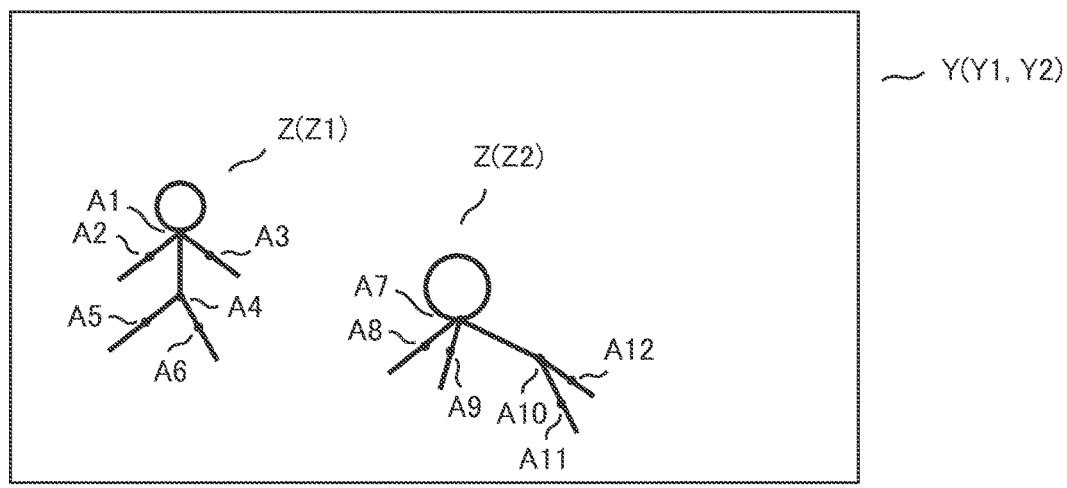
FIG. 1 is an explanatory view of a state of use of a suspicious or abnormal subject detecting device according to an embodiment of the present invention.

As shown in FIG. 1, the suspicious or abnormal subject detecting device 1 is for detecting a suspicious or abnormal subject from among action-subjects Z appeared in a plurality of time-series images Y (each frame constituting a moving image) photographed by a photographing means X. In the present embodiment, a human is adopted as the action subject Z, and the action subject Z is simply displayed only by the skeleton for easy understanding.

Figure 2:
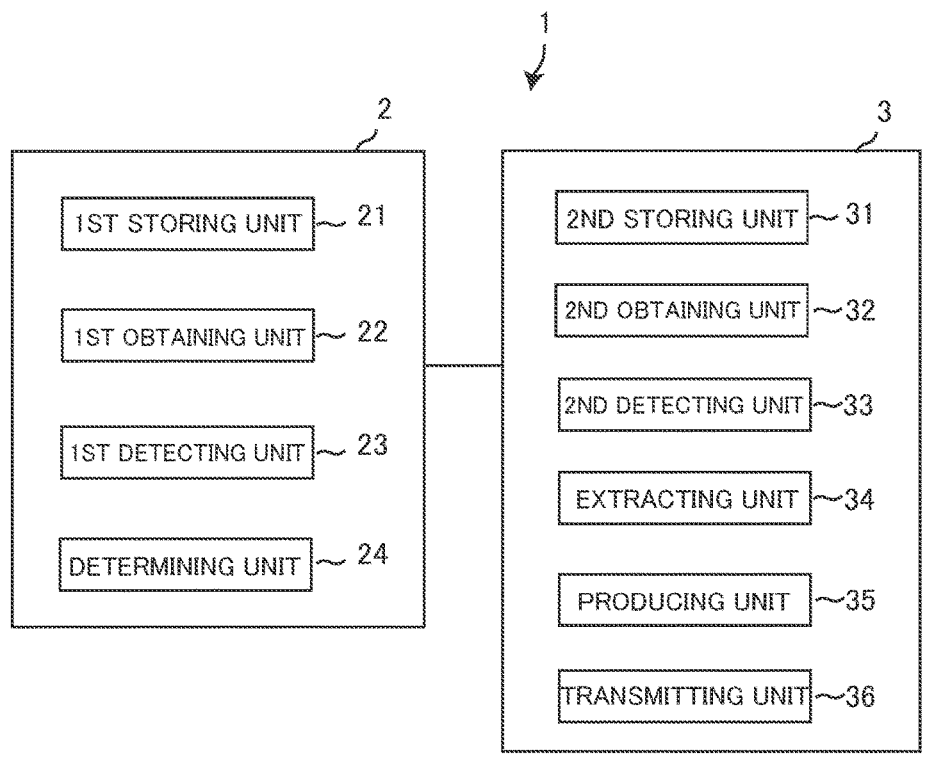
FIG. 2 is a block diagram of the suspicious or abnormal subject detecting device according to the embodiment of the present invention.
Figure 3:
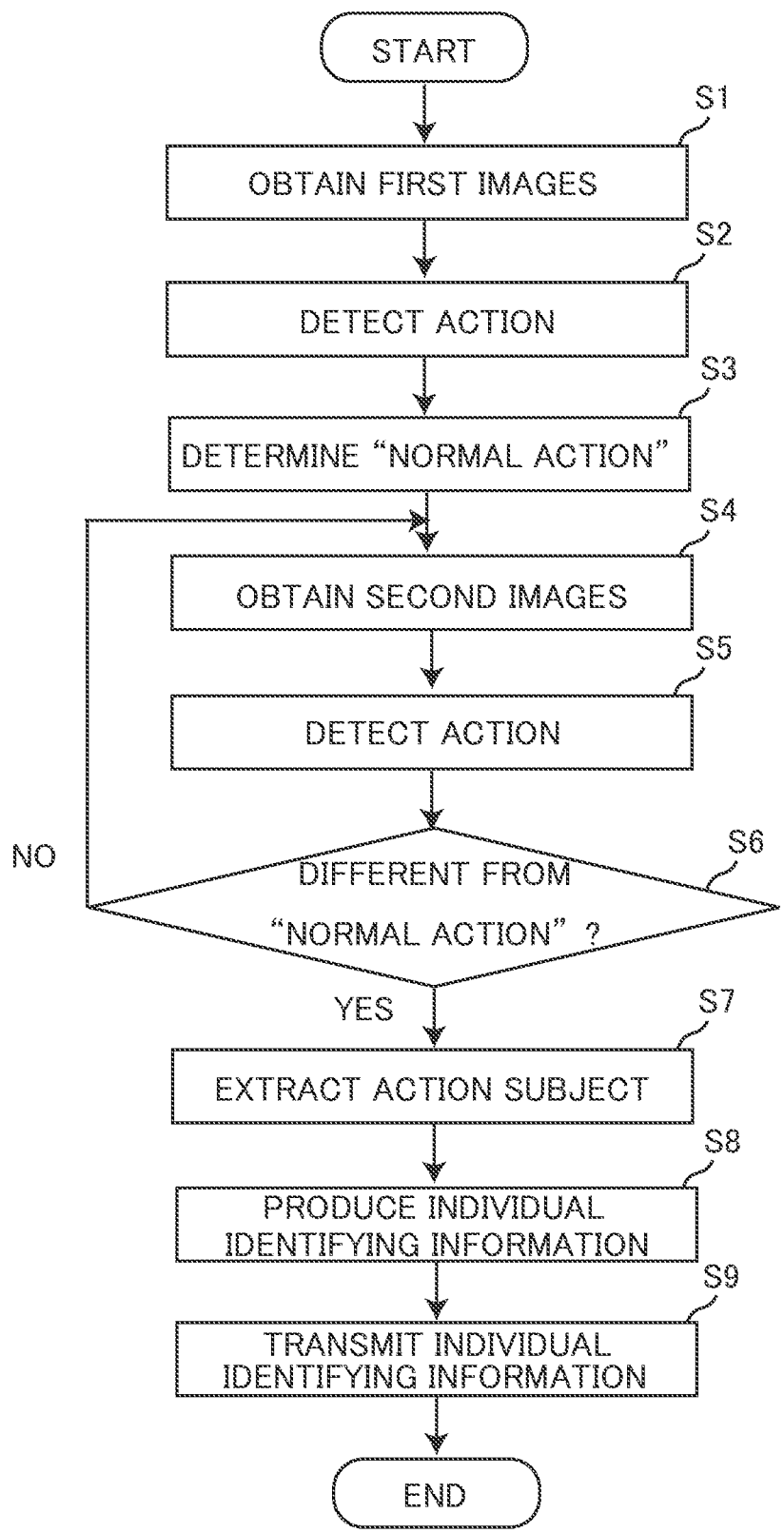
FIG. 3 is a flowchart of the suspicious or abnormal subject detecting device according to the embodiment of the present invention.

As shown in FIG. 2, the suspicious or abnormal subject detecting device 1 includes an accumulating device 2 and a detecting device 3. The detecting device 3 detects the suspicious or abnormal subject by referring to the data accumulated by the accumulating device 2.

The accumulating device 2 includes a first storing unit 21, a first obtaining unit 22, a first detecting unit 23, and a determining unit 24.

The first storing unit 21 stores the "articulation identification criteria" and the "action subject specific criteria."

The "articulation identification criteria" indicates the shape, direction, size, etc. for each articulation A to identify a plurality of articulations A (neck, right elbow, left elbow, waist, right knee, left knee in FIG. 1) of the action subject Z.

The "action subject specific criteria" indicates the "basic posture" of many variations of the action subject Z ("walking", "standing", etc.), the "range of movement of each articulation A", and the "distance between each articulation A in one action subject Z."

The first obtaining unit 22 obtains a plurality of first time-series images Y1 obtained by photographing a predetermined point. Preferably, the predetermined point is a point at which one or more predetermined actions are mainly performed.

As the predetermined action, for example, when the predetermined point is "in front of the merchandise shelf of the shop", "picking up the merchandise", "putting the merchandise into the shopping basket", and the like can be considered. Further, for example, when the predetermined point is "in a service counter of a store", "receive merchandise", "receive money", "open a cash register", "give change", "give merchandise", and the like can be considered.

The first detecting unit 23 specifies the action subject Z appeared in the plurality of first time-series images Y1, and detects the action of the specified action subject Z.

Although a known method can be used to specify the action subject Z, in this embodiment, a plurality of articulations A corresponding to the "articulation identification criteria" stored in the first storing unit 21 are detected, and then the plurality of articulations A included in one action subject Z are specified by referring to the "action subject specific criteria." In the example of FIG. 1, articulations A1 to A6 are specified as articulations A included in one action subject Z, whereas articulations A7 to A12 are specified as articulations A included in another action subject Z, and two action subjects Z are specified as being existed there.

With respect to the action detection, each articulation's movement during the predetermined action preformed may be stored in the first storing unit 21, and if the corresponding movement of each articulation is detected, it may be detected that the predetermined action is performed. Otherwise, the movement of the entire articulation A, the movement of the hip articulation A, or the movement of the center of gravity (moving speed in the XYZ direction) etc., may be simply detected.

The determining unit 24 determines one or more of "normal actions (normal movement of a plurality of articulations)" at the predetermined point based on a large number of actions (movement of the plurality of articulations) detected by the first detecting unit 23.

The "normal action" can be determined on various criteria. For example, from among entire detected actions, the action that occurred at a predetermined percentage or more may be determined as "normal action." In the example of the movement of the hip articulation A, the movement of the hip articulation A whose speed is in the XYZ direction within a predetermined range can be determined as the "normal action."

The "normal action" determined by the determining unit 24 is stored in the first storing unit 21.

The detecting device 3 includes a second storing unit 31, a second obtaining unit 32, a second detecting unit 33, an extracting unit 34, a producing unit 35, and a transmitting unit 36.

Similar to the first storing unit 21, the second storing unit stores "articulation identification criteria" and the "action subject specific criteria."

The second obtaining unit 32 obtains a plurality of second time-series images Y2 obtained by photographing the predetermined point. The plurality of second time-series images Y2 is preferably photographed by the photographing means X at substantially the same angle of view and magnification as that of the first obtaining unit 22.

The second detecting unit 33 specifies the action subject Z appeared in the plurality of second time-series images Y2, and detects the action of the specified action subject Z. The specification of the action subject Z and the detection of the action can be performed in the same manner as in the first detecting unit 23.

When the action detected by the second detecting unit 33 is different from the "normal action" determined by the determining unit 24, the extracting unit 34 extracts the action subject Z, which has performed the action different from the "normal action", from among the plurality of second time-series images Y2.

As actions different from "normal action", actions that are not appropriate for a predetermined point (types of action, traveling directions, traveling speeds, abnormal walking, and abnormal action (falling, collapsing, sitting down, circling action, etc.)) can be extracted.

The producing unit 35 produces individual identifying information for the extracted action subject Z based on at least one second time-series image Y2.

Although various types of individual identifying information can be considered, in the present embodiment, a focus mark is attached to the extracted action subject. Further, information on clothing, personal belongings, traveling direction, time, etc. are also attached as additional information.

The transmitting unit 36 automatically transmits the individual identification information produced by the producing unit 35 to the registered information terminal (information terminal of the security company, individual portable information terminal, etc.).

Next, detection of a suspicious or abnormal subject by the suspicious or abnormal subject detecting device 1 will be described with reference to the flowchart of FIG. 3.

The detection of suspicious or abnormal subjects is carried out in two steps such as "accumulating step" and "detecting step."

(1) Accumulating Step

In the accumulating step, firstly, when a plurality of first time-series images Y1 is obtained (S1), the action subject Z appeared in the plurality of first time-series images Y1 is specified, and the action of the specified action subject Z is detected (S2). It is preferable that S1 and S2 are performed for a plurality of different first time-series images Y1, and a large number of actions are detected.

Subsequently, one or more "normal actions" at a predetermined point are determined based on the plurality of actions detected in S2 (S3).

(2) Detecting Step

In the detecting step, firstly, a plurality of second time-series images Y2 is obtained (S4), then, the action subject Z appeared in the plurality of second time-series images Y2 is specified, and the action of the specified action subject Z is detected (S5).

Subsequently, when the action detected in S5 is different from the "normal action" determined in S3 (S6: YES), the action subject Z having performed the action different from the "normal action" is extracted from among the plurality of second time-series images Y2 (S7).

Subsequently, individual identifying information for the extracted action subject Z is produced based on at least one second time-series image Y2 (S8).

Finally, the individual identifying information produced in S8 is transmitted to the registered portable information terminal or the like (S9).

The suspicious or abnormal subject detecting device 1 having such a configuration can be used for various applications such as crime prevention and nursing care.

For example, by using the suspicious or abnormal subject detecting device 1 with respect to the time-series image Y obtained by photographing "in front of the merchandise shelf of the shop", it is possible to extract the action subject Z which has performed an action different from the "normal action" such as "putting the merchandise into the bag". Further, by using the suspicious or abnormal subject detecting device 1 with respect to the time-series image obtained by photographing "in front of the service counter of the store" or "inside the service counter of the store", it is possible to extract the action subject Z having performed an action different from "normal action" such as "taking out a blade".

In the case of the "road in front of the house", only family members and visitors usually visit the house, and many passers-by are to pass through the house. Therefore, by using the suspicious or abnormal subject detecting device 1 with respect to the time-series image Y obtained by photographing the "road in front of the house", it is possible to extract those persons other than the family members and the visitors among the action subjects Z having performed the "unusual action" such as "approaching the house."

Further, by using the suspicious or abnormal subject detecting device 1 with respect to the time-series image Y obtained by photographing "a private room in a hospital" or "a house of an elderly person living alone", it is possible to extract the action different from "normal action" (abnormal action) such as "falling". In the same way, it is possible to extract a drunk on a station platform, a lost child, a pickpocket or a fight in commercial facilities or the like.

It should be noted that the above-described types of action such as "putting merchandise into a bag" can be recognized by the individual identification information after the action subject Z having the possibility to be a suspicious or abnormal subject is found and extracted by detecting the "unusual action."

As described above, in the suspicious or abnormal subject detecting device 1 according to the present embodiment, when the action (movement of a plurality of articulations) detected by the second detecting unit 33 is different from the "normal action" determined by the determining unit 24, the action subject Z having performed the action different from the "normal action (normal movement of a plurality of articulations)" is extracted from among the plurality of second time-series images Y2.

With this configuration, it becomes possible to easily and high-accurately detect a suspicious or abnormal subject simply by detecting an "unusual action" without registering suspicious action in advance or identifying the type of detected action.

The suspicious or abnormal subject detecting device 1 according to the present embodiment produces individual identifying information for the extracted action subject Z based on at least one second time-series image Y2.

With this configuration, it becomes possible to confirm whether or not the extracted action subject Z has actually executed a suspicious or abnormal action, and to concretely grasp the characteristics of the extracted action subject Z.

In the suspicious or abnormal subject detecting device 1 according to the present embodiment, the individual identifying information produced by the producing unit 35 is automatically transmitted to the registered information terminal.

With this configuration, since it is possible to immediately notify an emergency or a danger to the outside, it becomes possible to quickly deal with it, attributing to a crime prevention.

While the suspicious or abnormal subject detecting device of the invention has been described in detail with reference to the preferred embodiment thereof, it would be apparent to those skilled in the art that many modifications and variations may be made therein without departing from the spirit of the invention, the scope of which is defined by the attached claims.

For example, in the above-described embodiment, the first storing unit 21 and the second storing unit 31, the first obtaining unit 22 and the second obtaining unit 32, and, the first detecting unit 23 and the second detecting unit 33 are provided in the accumulating device 2 and the detecting device 3, respectively. However, they may be commonly used, and such a case is also included in the scope of the present invention. Further, in the case of common use, the producing unit 35 and the transmitting unit 36 may be provided on the accumulating device 2 side.

It is also possible to activate only the detecting device 3 after data (a large number of actions) have been accumulated to some extent in the accumulating device 2. However, since lager amounts of data are preferable in order to increase the accuracy of detection of a suspicious or abnormal subject, it is preferable that the data-accumulation is continued by the accumulating device 2 in parallel with the operation of the detecting device 3 even after the data have been accumulated to some extent.

Although it is effective to perform the detection of the suspicious or abnormal subject in real time for the plurality of second time-series images Y2 according to the present embodiment, the detection of the suspicious or abnormal subject may be performed later for the recorded plurality of second time-series images Y2, depending on the purpose of use of the suspicious or abnormal subject detecting devise 1.

In the above-described embodiment, a human is used as an example of the action subject Z, but it is also possible to use an animal or a robot, instead. For example, in the case of a work robot, when it performs an action different from the preset action, it is detected as an abnormal action, so that a problem such as "a defect in the movable range" can be found.

In the above-described embodiment, "movements of the plurality of articulations included in the action subject appeared in the plurality of first time-series images" are detected with reference to the "articulation identification criteria" and the "action subject specific criteria." However, other methods for the detection can also be employed.

The present invention is also applied to a program that conducts the process of the suspicious or abnormal subject detecting devise 1, or to a record media accommodating the content of the program. In the case of record media, the program should be installed on the computer or the like. The record media storing the program may be reusable and not one-time use only. As reusable record media, for example, CD-ROM may be employed, but the record media is not limited to this.

DESCRIPTION OF THE REFERENCE NUMBER

1 suspicious or abnormal subject detecting device
2 accumulating device
3 detecting device
21 first storing unit
22 first obtaining unit
23 first detecting unit
24 determining unit
31 second storing unit
32 second obtaining unit
33 second detecting unit
34 extracting unit
35 producing unit
36 transmitting unit
X photographing means
Y time-series images
Z action subject

The invention claimed is:

1. A suspicious or abnormal subject detecting device comprising:
   an accumulating device; and
   a detecting device,
   wherein the accumulating device includes:
   a first obtaining unit configured to obtain a plurality of first time-series images obtained by photographing a predetermined point;
   a first detecting unit configured to detect movement of a plurality of articulations included in an action subject appeared in the plurality of first time-series images; and
   a determining unit configured to determine one or more of normal actions at the predetermined point based on a large number of the movement of a plurality of articulations detected by the first detecting unit,
   wherein the detecting device includes:
   a second obtaining unit configured to obtain a plurality of second time-series images obtained by photographing the predetermined point;
   a second detecting unit configured to detect movement of a plurality of articulations included in an action subject appeared in the plurality of second time-series images; and
   an extracting unit configured to extract, when the movement of a plurality of articulations detected by the second detecting unit is different from the normal action determined by the determining unit, an action subject which has performed an action different from the normal action from among the plurality of second time-series images, wherein the first detecting unit detects a plurality of articulations corresponding to articulation identification criteria for identifying a plurality of articulations of an action subject, specifies an action subject appeared in the plurality of first time-series images by specifying a plurality of articulations included in one action subject referring action subject specific criteria indicating basic postures of many variations of an action subject, ranges of movement of each articulation, and distances between each articulation in one action subject, and detects movement of the plurality of articulations included in the specified action subject, wherein the determining unit determines one or more of normal actions at the predetermined point based on the large number of the movement of the plurality of articulations detected by the first detecting unit, wherein the second detecting unit detects a plurality of articulations corresponding to articulation identification criteria for identifying a plurality of articulations of an action subject, in the plurality of second time-series images, specifies an action subject appeared in the plurality of second time-series images by specifying a plurality of articulations included in one action subject referring action subject specific criteria indicating basic postures of many variations of an action subject, ranges of movement of each articulation, and distances between each articulation in one action subject, and detects movement of the plurality of articulations included in the specified action subject, and wherein the extracting unit extracts, when the movement of a plurality of articulations detected by the second detecting unit is different from the normal action determined by the determining unit, an action subject which has performed an action different from the normal action from among the plurality of second time-series images.

2. The suspicious or abnormal subject detecting device according to claim 1, further comprising a producing unit configured to produce individual identifying information for the extracted action subject based on at least one second time-series image.

3. The suspicious or abnormal subject detecting device according to claim 2, further comprising a transmitting unit configured to automatically transmit the individual identification information produced by the producing unit to a registered information terminal.

4. A method for detecting a suspicious or abnormal subject comprising:

obtaining a plurality of first time-series images by photographing a predetermined point;

detecting movement of a plurality of articulations included in an action subject appeared in the plurality of first time-series images;

determining or more of normal actions at the predetermined point based on a large number of the movement of a plurality of articulations detected by the first detecting unit;

obtaining a plurality of second time-series images by photographing the predetermined point;

detecting movement of a plurality of articulations included in an action subject appeared in the plurality of second time-series images; and extracting, when the movement of a plurality of articulations detected with respect to the plurality of second time-series images is different from the determined normal action, an action subject which has performed an action different from the normal action from among the plurality of second time-series images, wherein the step for detecting in the plurality of first time-series images includes, detecting a plurality of articulations corresponding to articulation identification criteria for identifying a plurality of articulations of an action subject;

specifying an action subject appeared in the plurality of first time-series images by specifying a plurality of articulations included in one action subject referring action subject specific criteria indicating basic postures of many variations of an action subject, ranges of movement of each articulation, and distances between each articulation in one action subject; and detecting movement of the plurality of articulations included in the specified action subject, wherein the step for determining determines one or more of normal actions at the predetermined point based on the detected large number of the movement of the plurality of articulations, wherein the step for detecting in the plurality of second time-series images includes:

detecting a plurality of articulations corresponding to articulation identification criteria for identifying a plurality of articulations of an action subject, in the plurality of second time-series images;

specifying an action subject appeared in the plurality of second time-series images by specifying a plurality of articulations included in one action subject referring action subject specific criteria indicating basic postures of many variations of an action subject, ranges of movement of each articulation, and distances between each articulation in one action subject; and detecting movement of the plurality of articulations included in the specified action subject, and wherein the step for extracting extracts, when the movement of a plurality of articulations detected with respect to the second time-series images is different from the determined normal action, an action subject which has performed an action different from the normal action from among the plurality of second time-series images.

5. The method according to claim 4, further comprising producing individual identifying information for the extracted action subject based on at least one second time-series image.

6. The method according to claim 5, further comprising transmitting automatically the produced individual identification information to a registered information terminal.

* * * * *